United States Patent Office 3,535,426
Patented Oct. 20, 1970

3,535,426
STABILIZATION OF XANTHOPHYLLS
Orris D. Hawks, Rochester, N.Y., assignor to Eastman Kodak Company, Rochester, N.Y., a corporation of Delaware
No Drawing. Filed July 8, 1966, Ser. No. 563,711
Int. Cl. A01n 9/24; A23l 1/26
U.S. Cl. 424—343
5 Claims

ABSTRACT OF THE DISCLOSURE

A method of improving the stability of a xanthophyll concentrate containing an antioxidant comprising adding fat to the concentrate and then heating it at a temperature of at least 70° C. The heating can be accomplished by either spray drying or drum drying an aqueous slurry containing the xanthophyll concentrate, the antioxidant and the fat.

My invention relates to a method for stabilizing the xanthophyll content of vegetable matter, such as any dried marigold flower or petal products so that the quantity of active xanthophyll present remains essentially unchanged with the passage of time. My invention also relates to the novel xanthophyll-containing product resulting from the novel method, and to poultry feeds containing it.

Xanthophyll is a generic term for yellow coloring matter consisting of one or more oxygenated carotenoids found in many types of plants. Such xanthophyll has been found useful as a coloring agent for foods, and also for addition to poultry feed so as to develop a pleasingly yellow skin and shank pigmentation in poultry, as well as yellow, highly pigmented egg yolks which are in demand for the manufacture of egg noodles, yellow cake, and the like.

Dried and powdered whole marigold flowers and petals, generically called marigold meal, have been proposed for addition to poultry feed by French Pat. 1,305,-716 of G. D. Lackey, Jr. However, the biological effectiveness of the available xanthophyll is not as great as desired, so that it has been proposed to treat marigold meal with an alkali metal hydroxide to enhance the effectiveness of the xanthophyll for pigmenting poultry and egg yolks. One method of producing dry concentrate from dried marigold meal has involved treating the meal in a lower alkanol (e.g. ethyl, methyl or isopropyl alcohol) with an alkali, followed by neutralizing, removing the acohol, and drying the product, which is then added to poultry feed. This process is described in U.S. application Ser. No. 436,359, filed Mar. 1, 1965 by Peter M. Grant, and assigned to the Eastman Kodak Company, as is the present application. The disclosure of application Ser. No. 436,359 is incorporated by reference herein.

The xanthophyll in the dried marigold meal or in the product processed as described above is not as stable as desired for commercial use; the percentage of xanthophyll tends to diminish with the passage of time, probably due to oxidation of the material by the atmosphere. Some success has been achieved by the addition of antioxidants such as ethoxyquin (6-ethoxy-2,2,4-trimethyl-1,2-dihydroquinoline) or tocopherol.

In accordance with the present invention, xanthophyll concentrate containing an antioxidant is produced, and is further stabilized by a combination treatment comprising the addition of a fat or fatty-like material to the concentrate, followed by heat treating the xanthophyll concentrate in an essentially dry state, as by drum drying or spray drying a slurry of the material at a temperature substantially above room temperature, for example, at a temperature of at least 70° C. It is not entirely clear why the fat has a beneficial effect, but it may be that it brings the xanthophyll into better contact with the antioxidant because of their mutual solubility in the fat.

More particularly, the fat may include both fats and oils, the free fatty acids or derived lipids, and glycerides or fatty alcohols. The fat may be an edible vegetable fat, such as soybean oil, cottonseed oil, corn oil, or sunflower seed oil. It may be of animal origin such as beef or pig tallow and other tallows and greases. Whale oil and fish oils and fats generally can also be used.

While even small amounts of fat enhance the stability of the product, the most advantageous results are obtained with at least 5% of fat, based on the weight of the marigold meal; and an upper limit of 35% of fat is an economical one, since the increased addition of fat above this upper limit is not accompanied by a commensurate improvement in stability. The preferred range is 10 to 20%.

The temperature of heat treatment should be at least 70° C., but the time required for heat treatment diminishes as the temperature increases so that it is normally desirable to use higher temperatures, such as 110° C. to 165° C. An operable upper limit is 180° C., but higher temperatures may tend to produce degradation of the xanthophyll. Substantially the same stabilization results are secured by heating one minute or less at 165° C. as by heating ten hours at 70° C.

The heat treatment can be carried out conveniently and effectively by drying an aqueous slurry of alkali-treated marigold meal containing antioxidants and fat on a drum drier, with rolls at the selected temperature, as at a temperature between 110° C. and 165° C., running at a speed of between one and four r.p.m. Spray drying also has been used successfully. The following examples illustrate how the invention has been carried out, and the beneficial results secured.

EXAMPLE 1

20 grams of marigold meal [1.4% xanthophyll; E (1%, 1 cm.) (454 m$\mu$)=32, alkali consumption value=223] were slurried in 600 ml. of ethanol and .225 gram of ethoxyquin was added. 50 grams of sodium hydroxide dissolved in 35 ml. of hot water were added to the slurry, which was then heated at a temperature of about 80° C. under reflux conditions for two hours. The slurry was then neutralized wih a 25 percent solution of phosphoric acid in water, and .225 gram of ethoxyquin and .45 gram of tocopherol were added as antioxidants.

The product was then divided into fractions and different amounts of a mixture of two parts tallow to one part stearic acid by weight were added and mixed intimately therein. The ethanol was removed by distillation and was replaced with water until an essentially aqueous slurry was obtained. Part of this aqueous slurry was spray dried in a spray dier having an inlet temperature of 260° C. and an outlet temperature of 70° C. The rest of the slurry was drum dried on a drum heated with steam supplied at 140° C. to which it was subjected for about 30 seconds, the temperature when removed from the drum being about 120° C.

The resulting dried products were analyzed for xanthophyll content, and were then placed in an oven at 43° C. and held for one week, after which the examples were again analyzed for xanthophyll content. The analysis involved extracting the products with chloroform and determining the xanthophyll content by absorption spectra.

TABLE I

| Tallow:stearic acid, percent | Percent xanthophyll recovery | |
|---|---|---|
| | Drum dried, stored 1 week at 43° C. | Spray dried, stored 1 week at 43° C. |
| 0 | 82.0 | 64.3 |
| 5 | 91.2 | 69.7 |
| 10 | 101.0 | 98.2 |
| 15 | 99.6 | 96.5 |

It will be observed from the foregoing data that the addition of fat combined with heat treatment increased the stability of the xanthophyll in both the drum dried product and the spray dried product. It will also be observed that the greatest stability improvement occurred with the combination of fat addition and the more rigorous heat treatment by drum drying.

EXAMPLE 2

Following the procedure of Example 1, the effect of stearic acid and of glycerol monostearate in the amount of 15% by weight of the marigold meal was determined. The following Table II shows the beneficial results obtained with both spray drying and heat treatment by drum drying, and compares the results with the same product to which no fat had been added and to which 15% of a 2:1 tallow-stearic acid mixture had been added.

TABLE II

| Fat added (15%) | Percent xanthophyll recovery | |
|---|---|---|
| | Drum dried, stored 1 week at 43° C. | Spray dried, stored 1 week at 43° C. |
| Tallow:stearic acid | 99.6 | 96.5 |
| Stearic acid | 96.1 | Not determined |
| Glycerol monostearate | 101.0 | 97.1 |
| No fat added | 82.0 | 64.3 |

Again stability was improved by fat addition even in the spray dried product, but the combination of fat and drum drying gave the best results.

EXAMPLE 3

Following the procedure of Example 1, the effect of various fats in combination with drum drying with the rolls at a temperature developed by steam at 140° C. was investigated, with the results shown in Table III below:

TABLE III

| Fat | Wt. percent | Storage time | Percent xanthophyll recovery |
|---|---|---|---|
| Yellow grease | 15 | 1 week at 43° C | 87 |
| Glycerol mono-oleate | 10 | 12 days at 43° C | 97 |
| Corn oil | 10 | 6 months at room temp. | 96 |
| Acetylated glycerol monstearate | 10 | 1 week at 43° C | 97 |
| Tallow | 15 | 8 days at 43° C | 100 |

EXAMPLE 4

3 kilograms of marigold petal meal were slurried in 7.5 kilograms of ethanol, and a solution of 0.63 kilogram of sodium hydroxide in 0.4 kilogram of water was added. The resulting slurry was stirred and refluxed at a temperature of about 80° C. for 1.5 hours, and then neutralized to a pH of 8 with a solution of 2.5 kilograms of 86 percent phosphoric acid in ethanol (16.7%). 0.3 kilogram of tallow, 0.15 kilogram of stearic acid, 12 grams of ethoxyquin, and 24 grams of tocopherol then were added.

Ethanol was removed by distillation and replaced with water until an essentially aqueous slurry was obtained. Portions of this slurry were drum dried under different conditions, and the stability of the dried products was determined by storage for one week at 43° C. (xanthophyll analysis being conducted before and after, as described in Example 1).

The following Table IV describes the conditions of the drying operation and the percent recovery.

TABLE IV

| Drum drier settings | | | | |
|---|---|---|---|---|
| Steam | | Rolls, r.p.m. | Gap., in. | Percent xanthophyll recovery |
| P.s.i. | Temp., ° C. | | | |
| 40 | 140 | 3.5 | .008 | 87.4 |
| 40 | 140 | 1.75 | .008 | 89.7 |
| 65 | 155 | 3.5 | .008 | 91.0 |
| 65 | 155 | 1.75 | .008 | 96.3 |
| 65 | 155 | 3.5 | .004 | 94.8 |

It will be observed from Table IV that the more rigorous the heat treatment as to temperature and time, the greater the stability.

The stabilizing steps of the present invention also are beneficial when applied to the process described and claimed in the concurrently filed application Ser. No. 563,701 of James G. Baxter filed July 8, 1966 and now abandoned. In that application, after the alcohol is removed and replaced with water, as described in Example 1 above, the resulting aqueous slurry is filtered or centrifuged to remove the water containing dissolved salts and other non-xanthophyll materials, and the wet filter cake is then heat treated as described.

This invention has been described in detail with particular reference to preferred embodiments thereof, but it will be understood that variations and modifications can be effected within the spirit and scope of the invention as described hereinabove and as defined in the appended claims.

I claim:

1. A method of preparing a dried marigold xanthophyll concentrate having improved stability, said method comprising preparing an aqueous slurry consisting essentially of alkali saponified marigold meal, an antioxidant therefor, and fat in an amount sufficient to enhance stability of the product; drying and heat treating said slurry at a temperature of at least about 70° C.; and recovering the resulting dried and heat treated xanthophyll concentrate as product having improved stability.

2. A method in accordance with claim 1 wherein said slurry is dried and heat treated by drum drying at a temperature of about 70° to 180° C.

3. A method in accordance with claim 1 wherein said slurry is dried and heat treated by spray drying at a temperature of about 70° to 180° C.

4. A method in accordance with claim 1 wherein said aqueous slurry is prepared by forming a first slurry of marigold meal in a lower alkanol; adding alkali metal hydroxide to said first slurry; heating said first slurry; neutralizing said first slurry; then adding said antioxidant and said fat to said first slurry so neutralized, said fat in amount from about 5 to 35% by weight based on said marigold meal; removing said lower alkanol; and replacing said lower alkanol with water.

5. A dried xanthophyll concentrate consisting essentially of alkali saponified marigold meal, an antioxidant, and about 5 to 35% of fat based on said marigold meal, said xanthophyll concentrate having been prepared by drying the slurry of claim 1 at a temperature of at least about 70° C.

References Cited

UNITED STATES PATENTS

| | | | |
|---|---|---|---|
| 2,685,517 | 8/1954 | Dunmire | 99—2 |
| 2,777,797 | 1/1957 | Hockberg et al. | 99—2 |
| 2,841,495 | 7/1958 | Stewart | 99—2 |
| 3,125,451 | 3/1964 | Wingerd et al. | 99—2 |
| 3,333,962 | 8/1967 | Prebludal et al. | 99—2 |

FOREIGN PATENTS 760,011  10/1956  Great Britain.

OTHER REFERENCES

Bordick: Economic Botany, vol. 10, 1956, pp. 267–79.
Chemical Abstracts, vol. 65, 1966, p. 20761a.
Chemical Abstracts, vol. 66, 1967, No. 18166f, p. 1737.

RAYMOND N. JONES, Primary Examiner

U.S. Cl. X.R.

99—148